N. D. MUNN.
NUT LOCK.
APPLICATION FILED JUNE 17, 1910.

973,544.

Patented Oct. 25, 1910.

UNITED STATES PATENT OFFICE.

NEIL D. MUNN, OF DRESDEN, ONTARIO, CANADA.

NUT-LOCK.

973,544.  Specification of Letters Patent.  Patented Oct. 25, 1910.

Application filed June 17, 1910. Serial No. 567,465.

*To all whom it may concern:*

Be it known that I, NEIL D. MUNN, of the town of Dresden, in the Province of Ontario, Canada, have invented certain new and useful Improvements in Nut-Locks, of which the following is a specification.

The object of my invention is to devise a simple, cheap and effective nut lock, and I attain my object by boring the nut with a transverse hole partly intersecting the hole for the bolt. A pin is driven into the transverse hole and the bolt hole then threaded, part of the thread being thus formed on the pin.

The essential feature of my invention lies in so boring the transverse hole for the pin that the pin is inclined to the bolt end in the opposite direction to the thread of the bolt hole where the latter is intersected by the pin. The nut is locked on a bolt by displacing the pin endwise, which movement effects a displacement of the portion of the thread cut on the pin not only laterally but also longitudinally of the bolt forming an effective lock. The most important result, however, of the inclination of the pin is that the latter will stay in the locking position without itself requiring to be locked.

Figure 1:
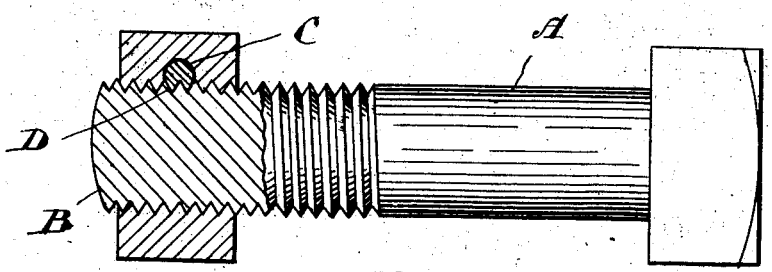
Figures 2, 3:
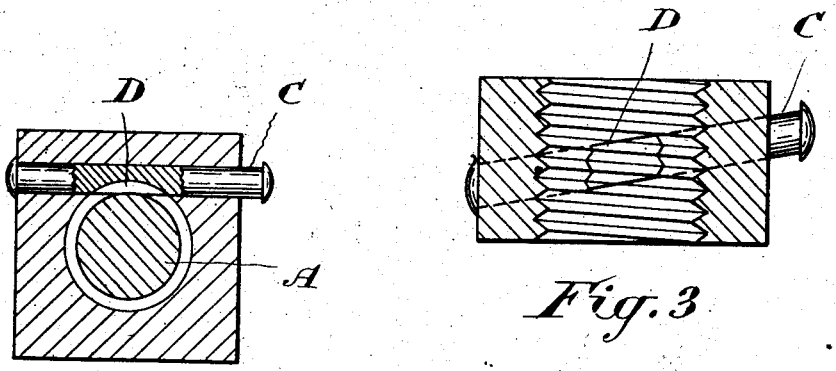
Figure 4:
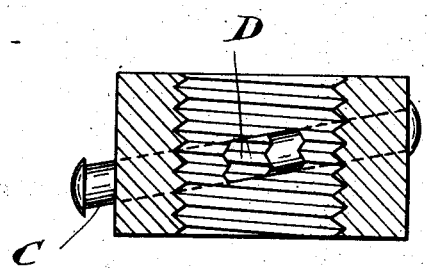

Figure 1 is a side elevation of a bolt and nut provided with my locking device the end of the bolt and nut being shown in section. Fig. 2 is a cross section through the nut and bolt. Figs. 3 and 4 are exaggerated sections of the nut showing the locking pin in two different positions.

In the drawings like letters of reference indicate corresponding parts in the different figures.

A is an ordinary bolt and B a nut having the usual threaded bolt opening therein.

C is the locking pin fitted in a transverse hole inclined to the bolt end as shown in Figs. 3 and 4 in an opposite direction to the inclination of the thread of the bolt hole where the latter is intersected by the pin. This pin is inserted in the bolt hole before the latter is threaded, and, consequently a portion D of the thread is formed on the pin. The nut is screwed on the bolt while the pin is in the position shown in Figs. 2 and 3. After the nut is in place the pin C is driven endwise, as shown particularly in Fig. 4, and the threads D thereon are displaced both laterally and longitudinally of the bolt. This produces a jamming action which effectively locks the nut in place, and owing to the longitudinal displacement the pin exhibits no tendency to loosen of itself.

From this description it will be seen that I have provided a very simple and effective nut lock fully attaining the advantages referred to in the preamble to this specification.

What I claim as my invention is:—

1. A nut having a transverse hole therein partly intersecting the bolt hole, in combination with a longitudinally movable pin passing through said hole and having part of the thread of the bolt hole cut thereon, the transverse hole being inclined to the bolt end in the opposite direction to the inclination of the thread of the bolt hole where the latter is intersected by the pin.

2. A nut for engaging with a bolt, provided with a threaded internal surface a portion of the threads of which is formed on the surface of a movable pin extending transversely of the nut and obliquely to the inclination of the threads thereof, such pin in one position making the thread of the nut continuous and uniform but when moved from such position transversely of the nut, displacing its threads both laterally and longitudinally of the threads of the said nut and of the bolt with which it engages.

Dresden, Ont. this 8th day of June 1910.

NEIL D. MUNN.

Signed in the presence of—

G. E. WEIR,
BELLE MOONEY.